(12) United States Patent
Park et al.

(10) Patent No.: US 9,941,520 B2
(45) Date of Patent: Apr. 10, 2018

(54) NEGATIVE ELECTRODE FOR SECONDARY BATTERY AND SECONDARY BATTERY INCLUDING THE NEGATIVE ELECTRODE

(71) Applicant: Samsung Electronics Co., Ltd., Suwon-si, Gyeonggi-do (KR)

(72) Inventors: Jonghwan Park, Yongin-si (KR); Inhyuk Son, Yongin-si (KR); Jaeman Choi, Hwaseong-si (KR); Seungsik Hwang, Seongnam-si (KR); Junhwan Ku, Seongnam-si (KR); Inyoung Song, Seongnam-si (KR); Yeonji Chung, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 213 days.

(21) Appl. No.: 14/456,009

(22) Filed: Aug. 11, 2014

(65) Prior Publication Data
US 2015/0243997 A1    Aug. 27, 2015

(30) Foreign Application Priority Data
Feb. 24, 2014    (KR) ........................ 10-2014-0021521

(51) Int. Cl.
*H01M 4/36* (2006.01)
*H01M 4/66* (2006.01)
*H01M 4/62* (2006.01)
*H01M 4/13* (2010.01)
*H01M 4/139* (2010.01)
*H01M 4/587* (2010.01)
*H01M 4/38* (2006.01)
*H01M 10/052* (2010.01)
*H01M 4/02* (2006.01)

(52) U.S. Cl.
CPC ............. *H01M 4/667* (2013.01); *H01M 4/13* (2013.01); *H01M 4/139* (2013.01); *H01M 4/364* (2013.01); *H01M 4/587* (2013.01); *H01M 4/622* (2013.01); *H01M 4/386* (2013.01); *H01M 10/052* (2013.01); *H01M 2004/021* (2013.01)

(58) Field of Classification Search
CPC ....... H01M 4/386; H01M 4/622; H01M 4/667
See application file for complete search history.

(56) References Cited

U.S. PATENT DOCUMENTS

| 6,844,113 B2 | 1/2005 | Yagi et al. |
| 7,459,233 B2 | 12/2008 | Konishiike et al. |

(Continued)

FOREIGN PATENT DOCUMENTS

| JP | 2002-289179 A | 10/2002 |
| JP | 2006-260784 A | 9/2006 |

(Continued)

OTHER PUBLICATIONS

Machine translation of JP 2006-260784, obtained May 23, 2016.*

(Continued)

*Primary Examiner* — Nicholas P D'Aniello
(74) *Attorney, Agent, or Firm* — Cantor Colburn LLP

(57) ABSTRACT

A negative electrode for a secondary battery, the negative electrode including: a current collector; an interlayer on the current collector and consisting of at least one first polymer selected from a cation-substituted polycarboxylic acid and a copolymer thereof; a negative electrode active material layer on the interlayer and which includes a negative electrode active material and a binder.

16 Claims, 13 Drawing Sheets

(56) References Cited

U.S. PATENT DOCUMENTS

| | | | |
|---|---|---|---|
| 7,939,218 B2 | 5/2011 | Niu | |
| 7,972,724 B2 * | 7/2011 | Kim | H01M 4/621 29/623.5 |
| 2008/0187838 A1 | 8/2008 | Le | |
| 2011/0111300 A1 | 5/2011 | Delhagen et al. | |
| 2011/0183169 A1 | 7/2011 | Bhardwaj et al. | |
| 2013/0040201 A1 | 2/2013 | Manthiram et al. | |
| 2013/0083496 A1 | 4/2013 | Franklin et al. | |
| 2013/0108907 A1 | 5/2013 | Bhardwaj et al. | |
| 2013/0164614 A1 | 6/2013 | Uemura | |
| 2014/0170467 A1 | 6/2014 | Kwon et al. | |

FOREIGN PATENT DOCUMENTS

| | | |
|---|---|---|
| JP | 4212392 B2 | 11/2008 |
| JP | 4768562 B2 | 6/2011 |
| JP | 2012-174521 A | 9/2012 |
| KR | 10-0450208 B1 | 9/2004 |
| KR | 10-0800968 B1 | 1/2008 |
| KR | 10-1120437 B1 | 2/2012 |
| KR | 1020120129097 A | 11/2012 |
| KR | 1020140035689 A | 3/2014 |
| KR | 1020140077622 A | 6/2014 |

OTHER PUBLICATIONS

Koo et al., "A Highly Cross-Linked Polymeric Binder for High-Performance Silicon Negative Electrodes in Lithium Ion Batteries", Supporting Information, Angewandte Chemie, 2012.

Koo et al., "A Highly Cross-Linked Polymeric Binder for High-Performance Silicon Negative Electrodes in Lithium Ion Batteries", Angew. Chem. Int. Ed. 51, 2012, pp. 8762-8767.

* cited by examiner

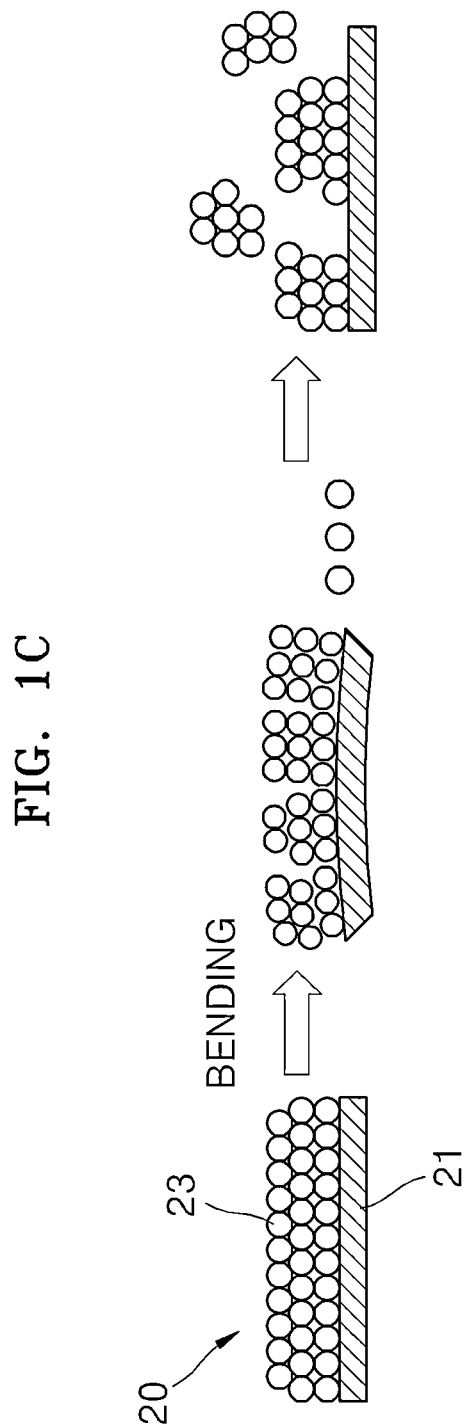

NEGATIVE ELECTRODE FOR SECONDARY BATTERY AND SECONDARY BATTERY INCLUDING THE NEGATIVE ELECTRODE

RELATED APPLICATION

This application claims the benefit of and priority to Korean Patent Application No. 10-2014-0021521, filed on Feb. 24, 2014, in the Korean Intellectual Property Office, and all the benefits accruing therefrom under 35 U.S.C. § 119, the content of which is incorporated herein in its entirety by reference.

BACKGROUND

1. Field

The present disclosure relates to a negative electrode for a secondary battery and a secondary battery including the negative electrode.

2. Description of the Related Art

A graphite-based negative electrode for a secondary battery has excellent lifetime and voltage characteristics but also has a low theoretical capacity. Thus, studies have been done to use a high capacity silicon-based material instead of graphite. However, a silicon-based material has not been widely used because of its rapid volume change that causes increased side reactions, detachment of an active material, and loss of a solid electrolyte interface ("SEI") layer, which are understood to cause deterioration of battery performance.

Therefore, a binder which is more capable of suppressing volume expansion of a silicon-based material and with fewer side reactions is needed. In the case of a silicon-based material, the particle size is small, and the particles may be in the form of a nanowire or a nanoparticle, and thus the silicon-based material has a large specific surface area compared to that of a graphite-based material. Therefore, as an amount of a binder needed increases, interfacial adhesion characteristics between a current collector and an active material layer weaken.

SUMMARY

Provided is a negative electrode for a secondary battery with improved interfacial adhesion properties between a current collector and a negative electrode active material layer.

Provided is a secondary battery having improved life characteristics due to inclusion of the negative electrode.

Additional aspects will be set forth in part in the description which follows and, in part, will be apparent from the description.

According to an aspect, a negative electrode for a secondary battery includes a current collector; an interlayer on the current collector and consisting of at least one first polymer selected from cation-substituted polycarboxylic acid and a copolymer thereof; and a negative electrode active material layer on the interlayer and which includes a negative electrode active material layer and a binder.

In an embodiment, the interlayer does not include a conducting agent.

According to another aspect, a secondary battery includes the negative electrode.

The secondary battery is a lithium secondary battery.

According to another aspect, a flexible battery includes the negative electrode.

BRIEF DESCRIPTION OF THE DRAWINGS

These and/or other aspects will become apparent and more readily appreciated from the following description of the embodiments, taken in conjunction with the accompanying drawings in which:

FIGS. 1B and 1C are conceptual views of an embodiment of another negative electrode active material for comparison with FIG. 1A;

DETAILED DESCRIPTION

Figure 1A:
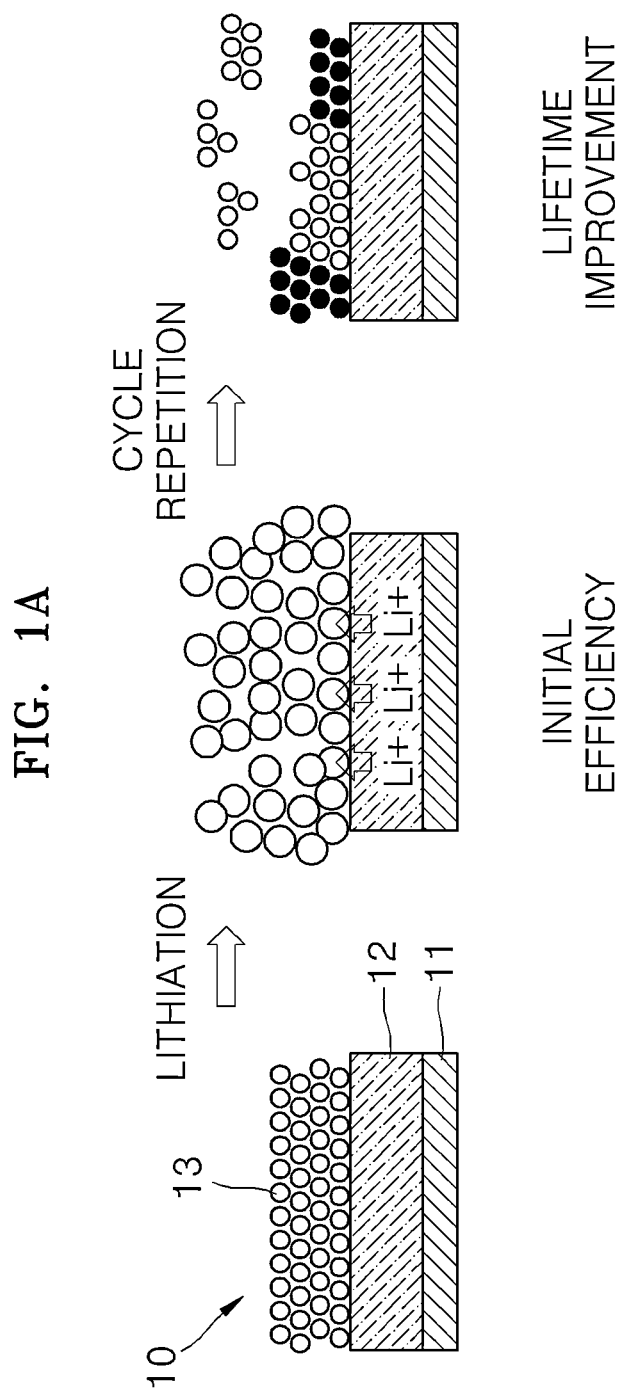
FIG. 1A is a conceptual view of an embodiment of a negative electrode.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a negative electrode for a secondary battery and a secondary battery including the negative electrode will be disclosed in further detail.

According to an embodiment, a negative electrode for a secondary battery is provided, wherein the negative electrode includes a current collector; an interlayer on the current collector, wherein the interlayer comprises or consists of at least one first polymer selected from a cation-substituted polycarboxylic acid, and a copolymer thereof; and a negative electrode active material layer on the interlayer, wherein the negative electrode active material layer includes a negative electrode active material and a binder. The interlayer may be formed on, e.g., directly on, the current collector, and the negative electrode active material layer may be formed on, e.g., directly on, the interlayer. In an embodiment the interlayer is directly on the current collector, and the negative electrode active material layer is directly on the interlayer.

In an embodiment, the interlayer comprises at least one polymer selected from a cation-substituted polycarboxylic acid, and a copolymer thereof. In another embodiment, the interlayer consists of at least one selected from a cation-substituted polycarboxylic acid, and a copolymer thereof.

In an embodiment, the interlayer does not include a conducting agent. When the interlayer does not include a conducting agent, which may be an inorganic material, the interlayer may be easily formed as a thin film. Since the interlayer may be formed as a thin film, an interfacial resistance between the active layer and the current collector is reduced.

A cation of the cation-substituted polycarboxylic acid and a copolymer thereof is at least one selected from a lithium ion ($Li^+$), a sodium ion ($Na^+$), a potassium ion ($K^+$), and an ammonium ion ($NH_4^+$).

The polycarboxylic acid denotes a polymer formed by polymerizing monomers of various types, where the monomers may include at least one monomer having at least one carboxylic group (—COOH), and a weight average molecular weight of the polycarboxylic acid is from about 1,000 to about 1,000,000 Daltons (Da), for example about 10,000 to about 900,000 Da, or about 100,000 to about 800,000 Da. Examples of the polycarboxylic acid include polyacrylic acid, polymethacrylic acid, and polymaleic acid. The cation-substituted polycarboxylic acid is a material in which a hydrogen atom is substituted with a cation in the polycarboxylic acid, wherein an example of the cation-substituted polycarboxylic acid may be at least one selected from lithium polyacrylate ("LiPAA") and lithium polymethacrylate.

The cation-substituted polycarboxylic acid copolymer is a copolymer containing a monomer repeating unit that corresponds to, e.g., resulting from the copolymerization of, the cation-substituted polycarboxylic acid, and an example of the copolymer may be a poly(acrylate-co-maleic acid) lithium salt, a poly(methylvinylether-alt-maleic acid) lithium salt, or a poly(butadiene-co-maleic acid) lithium salt.

The binder of the negative electrode active material layer described above may comprise a second polymer, which may also be a cation-substituted polycarboxylic acid or a copolymer thereof. The first polymer and the second polymer may be the same or different, and in an embodiment the first polymer in the second polymer are the same.

The binder of the negative electrode active material layer described above may have the same composition as the interlayer. In this regard, when the binder of the negative electrode active material layer and the interlayer have the same composition, adhesion between the interlayer and the negative electrode active material layer may increase.

When the interlayer is formed of a cation-substituted polycarboxylic acid or a copolymer thereof, cations, such as lithium ions, may be additionally supplied to the negative electrode active material layer. Thus, an initial efficiency of a secondary battery including the negative electrode may improve. Also, when the interlayer is included in the secondary battery, the battery performance improves since an adhesive strength between the current collector and the negative electrode active material layer is increased. Also, the stability and reliability of the battery to mechanical deformation, such as bending, increases as well. Therefore, in a battery system using a negative electrode including a silicon-based (i.e., silicon-comprising) material as a negative electrode active material, a high-capacity flexible battery may be manufactured which prevents detachment of an active material from a surface of a current collector resulting from volume change of a silicon active material, and by forming an interlayer to reduce an interfacial resistance between the current collector and a negative electrode active material layer.

A glass transition temperature of at least one selected from the cation-substituted polycarboxylic acid and a copolymer thereof is about 50° C. or greater, for example, from about 50° C. to about 200° C. or from about 50° C. to about 150° C. Also, a melting point of the at least one polymer selected from the cation-substituted polycarboxylic acid and a copolymer thereof is about 100° C. or greater, for example, from about 100° C. to about 300° C. or from about 100° C. to about 200° C.

When an interlayer is formed using the cation-substituted polycarboxylic acid and a copolymer thereof having the glass transition temperature and the melting point within these ranges above, a shape of the interlayer may be maintained at a battery operation temperature (e.g., from about 0° C. to about 90° C.), and the possibility of the cation-substituted polycarboxylic acid and a copolymer thereof being inserted into the negative electrode active material layer is reduced.

Also, the at least one polymer selected from the cation-substituted polycarboxylic acid and a copolymer thereof, i.e., the first polymer or the second polymer, is polymeric and thus may not be dissolved in an electrolyte. The electrolyte may contain, for example, a carbonate-based solvent, and the at least one polymer selected from the cation-substituted polycarboxylic acid and a copolymer thereof has substantially no solubility in the solvent.

The at least one polymer selected from the cation-substituted polycarboxylic acid and a copolymer thereof may have a weight average molecular weight of from about 1,000 to about 1,000,000 Da and a degree of polymerization DP of from about 10 to about 1500 DP, for example, from about 14 to about 1400 DP, or about 20 to about 1000 DP.

The negative electrode active material of the negative electrode active material layer may comprise a negative electrode active material including a silicon-based material.

The silicon-based material includes at least one selected from silicon, a silicon oxide, a silicon alloy, a mixture of a silicon-based material and a carbon-based material, and a complex or composite of a silicon-based material and a carbon-based material.

An amount of a carbon-based material in the complex of a silicon-based material and a carbon-based material or the mixture of a silicon-based material and a carbon-based material may be, for example, from about 1 part to about 20 parts by weight, or from about 5 parts to about 10 parts by weight, based on total weight of the complex.

The silicon oxide may be SiOx (where, 0<x<2, for example, from about 0.5 to about 1.5). The silicon alloy may include silicon and at least one metal selected from Al, Sn, Ag, Fe, Bi, Mg, Zn, in, Ge, Pb, and Ti.

The carbon-based material may include at least one selected from graphite and carbon nanotubes.

The silicon-based material may be, for example, a mixture of silicon and graphite or a complex of silicon and graphite.

In an embodiment, in the interlayer, an amount of the at least one first polymer selected from a cation-substituted polycarboxylic acid and a copolymer thereof is greater than an amount of the at least one second polymer selected from a cation-substituted polycarboxylic acid and a copolymer thereof used as a binder in the negative electrode active material layer.

Figure 2A:
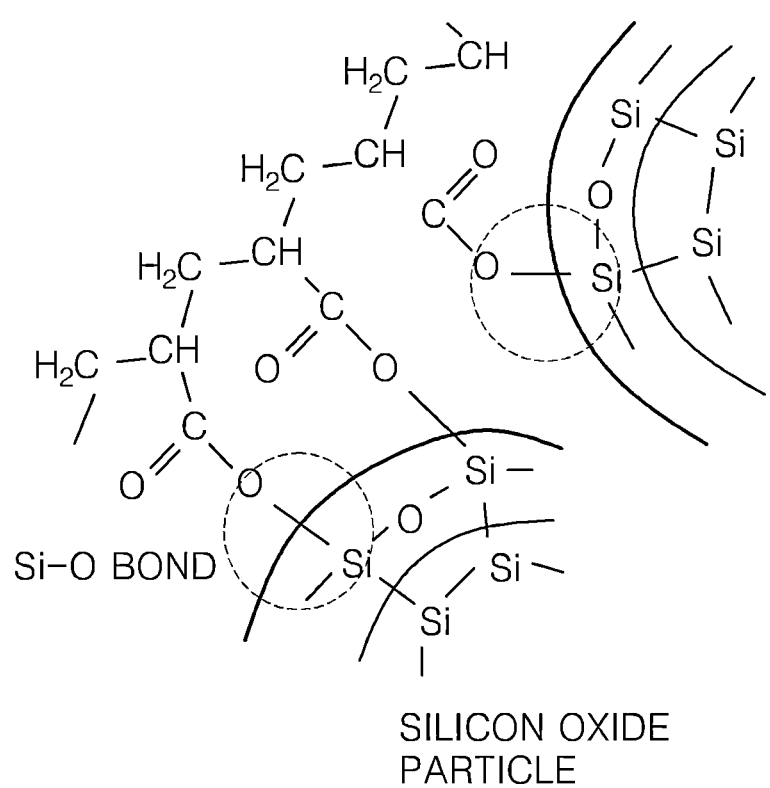
FIG. 2A illustrates an embodiment of a bond forming process between a silicon-based negative electrode active material and an interlayer in the negative electrode.

When the interlayer according to an embodiment is formed between the negative electrode active material layer including a silicon-based negative electrode active material and the current collector, as shown in FIG. 2A, a silanol group (—Si—OH) present on a surface of the silicon-based negative electrode active material, e.g., silicon oxide nanoparticles, reacts with a carboxyl group of a lithium polyacrylate ("LiPAA") forming the interlayer, and thus, and while not wanting to be bound by theory, it is understood that a —Si—O—C(=O)—O— covalent bond is formed. Therefore, a bonding strength between the interlayer and the negative electrode active material layer including silicon nanoparticles may significantly improve. Formation of the covalent bond may be confirmed through a nuclear magnetic resonance ("NMR") spectrum.

According to an embodiment, a thickness of the interlayer may be from about 100 nanometers (nm) to about 10 micrometers (μm), for example, from about 100 nm to about 2 μm. When a thickness of the interlayer is within this range, an interfacial resistance between the current collector and the negative electrode active material layer is low and an adhesive strength therebetween is excellent. Therefore, when a battery includes the negative electrode, a battery with excellent initial efficiency and rate capability may be manufactured. The interlayer may be useful in manufacturing a high capacity negative electrode including a silicon-based material and having a large specific surface area.

In the negative electrode according to an embodiment, a specific surface area of the negative electrode active material may be from about 5 square meters per gram ($m^2$/g) to about 1,000 $m^2$/g, for example, from about 10 $m^2$/g to about 300 $m^2$/g. When a specific surface area of the negative electrode active material is within this range, a secondary battery including the negative electrode active material may have excellent initial efficiency and lifetime characteristics.

Figure 1B:
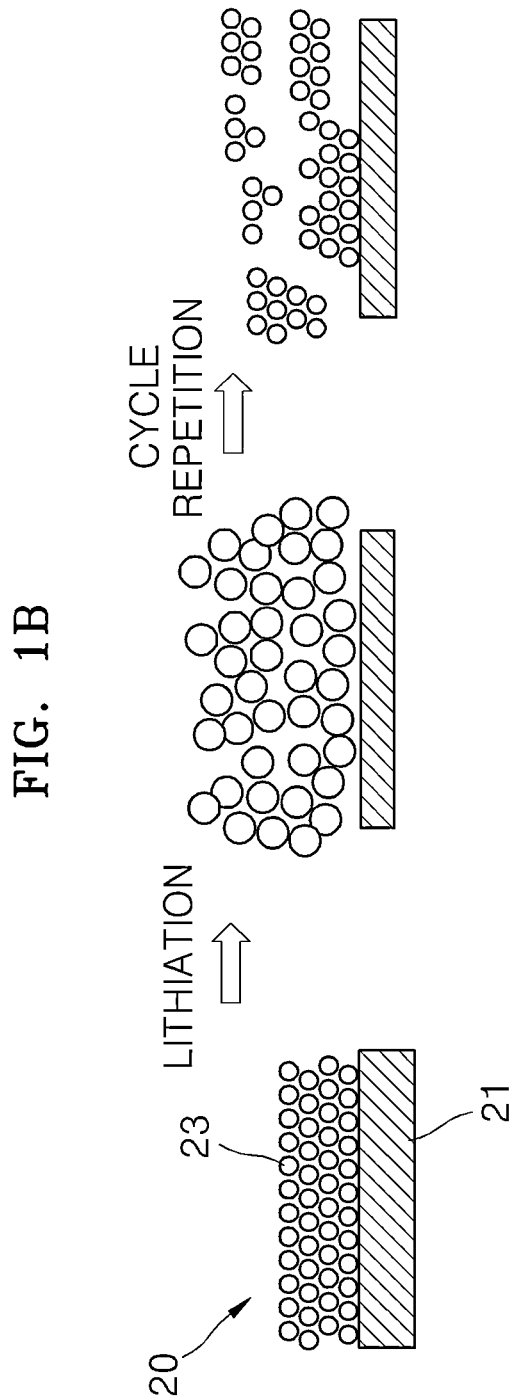

FIG. 1A is a conceptual view of a negative electrode according to an embodiment, and FIGS. 1B and 1C are conceptual views of another negative electrode for comparison with FIG. 1A.

A negative electrode 10 shown in FIG. 1A has an interlayer 12 formed of at least one first polymer selected from a cation-substituted polycarboxylic acid and a copolymer thereof according to an embodiment on a current collector 11, and a negative electrode active material layer 13 is formed on the interlayer 12.

Referring to FIG. 1B, when a lithiation process is performed on a negative electrode 20 not comprising the interlayer, a volume of a negative electrode active material in a negative electrode active material layer 23 formed on a current collector 21 expands, and when charging and discharging is repeated, detachment of the negative electrode active material from the negative electrode active material layer 23 is started. Also, as shown in FIG. 1C, when the negative electrode active material layer 23 not comprising the interlayer is formed on the current collector 21 of the negative electrode 20, and the negative electrode 20 is mechanically deformed, for example, due to bending, detachment of the negative electrode active material from the negative electrode active material layer 23 formed on the current collector 21 is started.

On the other hand, the negative electrode 10 according to an embodiment has a low interfacial resistance between the current collector 11 and the negative electrode active material layer 13, a low interfacial resistance between the current collector 11 and the interlayer 12, and excellent adhesive strength between the current collector 11 and the negative electrode active material layer 13 due to having the interlayer 12 formed on the current collector 11. Thus, and while not wanting to be bound by theory, when lithiation occurs, detachment of the negative electrode active material, which may occur for example from volume expansion of the negative electrode active material, is significantly suppressed. Also, lithium ions may be supplied to the negative electrode active material layer 13, and thus an initial efficiency of the secondary battery including the negative electrode 10 improves. In addition, under the condition of repeated cycles of charging/discharging the secondary battery including the negative electrode 10, detachment of the negative electrode active material from volume expansion of the negative electrode active material is significantly suppressed compared to the detachment in the general negative electrode 20 shown in FIGS. 1B and 1C.

Hereinafter, a method of preparing a negative electrode according to another embodiment will be further described.

First, a current collector is coated with a composition including at least one first polymer selected from a cation-substituted polycarboxylic acid and a copolymer thereof, and the current collector is dried to form an interlayer.

When coating the current collector with an upper surface of the current collector, a coating method is not particularly limited. For example, the coating may be performed by using one selected from a screen printing method, a spray coating method, a coating method with a doctor blade, a gravure coating method, a dip coating method, a silk screen method, a painting method, and a coating method with slot die.

The first polymer, and similarly the second polymer, comprise at least one selected from the cation-substituted polycarboxylic acid or a copolymer thereof, and may be obtained by mixing a polycarboxylic acid or a copolymer thereof with a cation-containing compound and a solvent and allowing them to react, and thus the composition including the cation-substituted polycarboxylic acid and a copolymer thereof may be obtained.

The reaction is a neutralization and is performed by reacting the polycarboxylic acid or a copolymer thereof with the cation-containing compound, wherein an acid group of polycarboxylic acid or a copolymer thereof reacts with a base group of the cation-containing compound.

Examples of the cation-containing compound may include a lithium hydroxide, a potassium hydroxide, an ammonium hydroxide, and a sodium hydroxide.

The cation-substituted polycarboxylic acid or a copolymer thereof comprises a cation, wherein the cation may be contained in an amount of at least about 50 mol %, at least about 60 mol %, at least about 70 mol %, at least about 80 mol %, at least about 90 mol %, or about 100 mol %, or about 50 mol % to about mol %, or 60 mol % to about 90 mol %, of a lithium ion based on a molar equivalent of the carboxylic group.

Examples of the solvent include deionized water, tetrahydrofuran, N,N-dimethylsulfoxide, N,N-dimethylformamide, and a mixture thereof. Here, an amount of the solvent may be about 200 parts to about 3000 parts by weight, based on 100 parts by weight of polycarboxylic acid.

The reaction between the polycarboxylic acid or a copolymer thereof and the cation-containing compound may be performed at a temperature of about 10° C. to about 30° C., for example, about 20° C. to about 25° C.

The drying is performed at a temperature of about 80° C. to about 120° C.

According to another embodiment, a sodium salt of the polycarboxylic acid may be used as a starting material to substitute the sodium cation with a lithium cation using an ion-exchange resin.

The interlayer may be easily prepared by using the method described above.

A negative electrode having a negative electrode active material layer on a negative electrode current collector may be prepared by obtaining a negative electrode active material composition including a negative electrode active material, a binder, a conducting agent, and a solvent; coating the composition on the interlayer; and drying and pressing the resultant.

A drying process may be further added after the pressing process.

The drying may be performed by, for example, a heat-treating process at a temperature of about 80° C. to about 120° C.

When coating the interlayer with the negative electrode active material composition, a coating method is not particularly limited. For example, the coating may be performed by a method selected from a screen printing method, a spray coating method, a coating method with a doctor blade, a gravure coating method, a dip coating method, a silk screen method, a painting method, and a coating method with slot die.

The pressing may be performed by using a pressing method with a calendar roll or a flat press.

As is further disclosed above, a material for the binder may be the same material used to form the interlayer. An example of the second polymer of the binder may be at least one selected from a cation-substituted polycarboxylic acid and a copolymer thereof. Also, the binder may comprise or further comprise another binder material available in the art. For example, the binder material may further include sodium-carboxymethylcellulose ("Na-CMC"), an alginic acid derivative, a chitosan derivative, polyvinyl alcohol ("PVA"), polyacrylic acid ("PAA""), polysodium acrylate ("Na-PAA"), polyvinylpyrrolidone ("PVP"), polyacrylamide, polyamideinmide, vinylidene fluoride/hexafluoropropylene copolymer ("PVDF-HFP"), polyvinylidenefluoride ("PVDF"), polyacrylonitrile ("PAN"), aqueous-dispersion type styrene-butadiene rubber ("SBR"), aqueous-dispersion type butadiene rubber ("BR"), a modified product thereof (for example, a fluorinated polymer or a polymer with a sulfone ($-SO_2-$) substituent in a main chain), or a copolymer thereof (for example, a random copolymer, a block copolymer, or an alternating polymer with other polymers).

An amount of the binder may be from about 1 part to about 20 parts by weight, for example, from about 1 part to about 10 parts by weight, based on 100 parts by weight of the negative electrode active material layer.

The negative electrode active material may comprise a silicon-based material as described above.

In some embodiments, the negative electrode active material may include a metal/semi-metal alloyable with lithium, an alloy thereof, or an oxide thereof. Examples of the metal/semi-metal alloyable with lithium are Si, Sn, Al, Ge, Pb, Bi, Sb, a Si—X alloy (wherein X is an alkali metal, an alkali earth metal, a Group 13 element, a Group 14 element, a transition metal, a rare earth element, or a combination thereof except for Si), a Sn—X alloy (wherein X is an alkali metal, an alkali earth metal, a Group 13 element, a Group 14 element, a transition metal, a rare earth element, or a combination thereof except for Sn), and $MnO_x$ (where $0<x\le2$). X may be at least one selected from magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), and polonium (Po). Non-limiting examples of the oxide of the metal/semi-metal alloyable with lithium are a lithium titanium oxide, a vanadium oxide, and a lithium vanadium oxide, $SnO_2$, and $SiO_x$ (where $0<x<2$).

For example, the negative active material may include at least one element selected from the elements of Groups 13, 14, and 15 of the Periodic Table of Elements.

The negative active material may be a mixture including at least one selected from the materials listed above.

In some embodiments, the negative active material may have a simple particulate form, or may have a nanostructure, for example having a particle size of about 1 to about 100 nm, or about 10 to about 80 nm. In some embodiments, the negative active material may have any of a variety of forms, for example, nanoparticles, nanowires, nanorods, nanotubes, or nanobelts.

In some embodiments, the negative active material may include a mixture of silicon and graphite, a silicon-graphite composite, a Si-based material-carbon nanotube (CNT) composite, or a silicon oxide.

The negative electrode active material layer may further include components, such as, a conducting aid, a supporting salt, or an ion conductive polymer. Also, when an ion conductive polymer is included in the negative electrode active material layer, a polymerization initiator for polymerizing the polymer may be further included. Moreover, a mixing ratio of the components is not limited but may be at a level generally used in the manufacture of a secondary battery.

The current collector is not particularly limited, and may be formed of any suitable material which has a conductivity suitable for a secondary battery but does not cause undesired chemical changes in the manufactured secondary battery. Examples of the material for forming the current collector are copper, stainless steel, aluminum, nickel, titanium, sintered carbon, copper, or stainless steel that is surface-treated with carbon, nickel, titanium or silver, and aluminum-cadmium alloys.

In addition, the current collector may have fine irregularities on a surface thereof so as to enhance adhesion of the current collector to the negative active material, and may be used in any of a variety of forms, including films, sheets, foils, nets, porous structures, foams, and non-woven fabrics.

According to another embodiment, a secondary battery including the negative electrode is provided.

The secondary battery may be, for example, a lithium secondary battery or a sodium secondary battery.

A positive electrode active material forming a positive electrode of a lithium secondary battery may be a compound capable of reversible intercalation and deintercalation of lithium (i.e., a lithiated intercalation compound). The positive active material may include at least one selected from lithium cobalt oxide, lithium nickel cobalt manganese oxide, lithium nickel cobalt aluminum oxide, lithium iron phosphorous oxide, and lithium manganese oxide. The positive active material is not limited to these examples, and any suitable positive active material available in the art may be used.

For example, the positive active material may be at least one selected from a lithium cobalt oxide such as $LiCoO_2$; a lithium nickel oxide such as $LiNiO_2$; a lithium manganese oxide such as $Li_{1+x}Mn_{2-x}O_4$ (wherein x is from 0 to 0.33); a lithium manganese oxide such as $LiMnO_3$, $LiMn_2O_3$, or $LiMnO_2$; a lithium copper oxide such as $Li_2CuO_2$; a lithium iron oxide such as $LiFe_3O_4$; a lithium vanadium oxide such as $LiV_3O_8$; a copper vanadium oxide such as $Cu_2V_2O_7$; a vanadium oxide such as $V_2O_5$; a lithium nickel oxide such as $LiNi_{1-x}M_xO_2$ (wherein M is Co, Mn, Al, Cu, Fe, Mg, B, or Ga, and x is from 0.01 to 0.3); a lithium manganese composite oxide such as $LiMn_{2-x}M_xO_2$ (wherein M is Co, Ni, Fe, Cr, Zn, or Ta, and x is from 0.01 to 0.1) or $Li_2Mn_3MO_8$ (wherein M is Fe, Co, Ni, Cu, or Zn); a lithium manganese oxide ($LiMn_2O_4$) with partial substitution of lithium by alkali earth metal ions; a disulfide compound; and an iron molybdenum oxide represented by $Fe_2(MoO_4)_3$.

For example, the positive active material may be a compound represented by one of the following formulas: $Li_aA_{1-b}R_bD_2$ (where, $0.90 \le a \le 1.8$ and $0 \le b \le 0.5$); $Li_aE_{1-b}R_bO_{2-c}D_c$ (wherein $0.90 \le a \le 1.8$, $0 \le b \le 0.5$, and $0 \le c \le 0.05$); $LiE_{2-b}R_bO_{4-c}D_c$ (wherein $0 \le n \le 0.5$ and $0 \le c \le 0.05$); $Li_aNi_{1-b-c}Co_bR_cD_\alpha$ (wherein $0.90=a \le 1.8$, $0 \le b \le 0.5$, $0 \le c \le 0.05$, and $0<\alpha \le 2$); $Li_aNi_{1-b-c}Co_bR_cO_{2-\alpha}R'_\alpha$ (wherein $0.90 \le a \le 1.8$, $0 \le b \le 0.5$, $0 \le c \le 0.05$, and $0<\alpha<2$); $Li_aNi_{1-b-c}Co_bR_cO_{2-\alpha}R'_\alpha$ (wherein $0.90 \le a \le 1.8$, $0 \le b \le 0.5$, $0 \le c \le 0.05$, and $0<\alpha<2$); $Li_aNi_{1-b-c}Mn_bR_cD_\alpha$ (wherein $0.90 \le a \le 1.8$, $0 \le b \le 0.5$, $0 \le c \le 0.05$, and $0<\alpha \le 2$); $Li_aNi_{1-b-c}Mn_bR_cO_{2-\alpha}R'_\alpha$ (wherein $0.90 \le a \le 1.8$, $\le b \le 0.5$, $0 \le c \le 0.05$, and $0<\alpha<2$); $Li_aNi_{1-b-c}Mn_bR_cO_{2-\alpha}R'_\alpha$ (wherein $0.90 \le a \le 1.8$, $0 \le b \le 0.5$, $0 \le c \le 0.05$, and $0<\alpha<2$); $Li_aNi_bE_cG_dO_2$ (wherein $0.90 \le a \le 1.8$, $0 \le b \le 0.9$, $0 \le c \le 0.5$, and $0.001 \le d \le 0.1$); $Li_aNi_bCo_cMn_dGeO_2$ (wherein $0.90 \le a \le 1.8$, $0 \le b \le 0.9$, $0 \le c \le 0.5$, $0 \le d \le 0.5$, and $0.001 \le e \le 0.1$); $Li_aNiG_bO_2$ (wherein $0.90 \le a \le 1.8$ and $0.001 \le b \le 0.1$); $Li_aCoG_bO_2$ (wherein $0.90 \le a \le 1.8$ and $0.001 \le b \le 0.1$); $Li_aMnG_bO_2$ (where, $0.90 \le a \le 1.8$ and $0.001 \le b \le 0.1$); $Li_aMn_2G_bO_4$ (wherein $0.90 \le a \le 1.8$ and $0.001 \le b \le 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3 (0 \le f \le 2)$; $Li_{(3-f)}Fe_2(PO_4)_3 (0 \le f \le 2)$; and $LiFePO_4$.

In the formulas above, A is nickel (Ni), cobalt (Co), manganese (Mn), or a combination thereof; R is aluminum (Al), nickel (Ni), cobalt (Co), manganese (Mn), chromium (Cr), iron (Fe), magnesium (Mg), strontium (Sr), vanadium (V), a rare earth element, or a combination thereof; D is oxygen (O), fluorine (F), sulfur (S), phosphorus (P), or a combination thereof; E is cobalt (Co), manganese (Mn), or a combination thereof; R' is fluorine (F), sulfur (S), phosphorus (P), or a combination thereof; G is aluminum (Al), chromium (Cr), manganese (Mn), iron (Fe), magnesium (Mg), lanthanum (La), cerium (Ce), strontium (Sr), vanadium (V), or a combination thereof; Q is titanium (Ti), molybdenum (Mo), manganese (Mn), or a combination thereof; I is chromium (Cr), vanadium (V), iron (Fe), scandium (Sc), yttrium (Y), or a combination thereof; and J is vanadium (V), chromium (Cr), manganese (Mn), cobalt (Co), nickel (Ni), copper (Cu), or a combination thereof.

The compounds listed above as positive active materials may have a surface coating layer (hereinafter, "coating layer"). Alternatively, a mixture of a compound that does not have a coating layer and a compound having a coating layer, the compounds being selected from the compounds listed above, may be used. The coating layer may include at least one compound of a coating element selected from an oxide, hydroxide, oxyhydroxide, oxycarbonate, and hydroxycarbonate of the coating element. The compounds for the coating layer may be amorphous or crystalline. The coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a mixture thereof. The coating layer may be formed using any of the above-listed compounds including these elements, according to any appropriate method that does not adversely affect physical properties of the positive active material when a compound of the coating element is used. For example, the coating layer may be formed using spray-coating, dipping, or the like. The details of the coating layer can be determined by one of skill in the art without undue experimentation, and thus further details are not disclosed herein for clarity. Non-limiting examples of the positive active material are $LiNiO_2$, $LiCoO_2$, $LiMn_xO_{2x}$ (x=1, 2), $LiNi_{1-x}Mn_xO_2$ (0<x<1), $LiNi_{1-x-y}Co_xMn_yO_2$ (0≤x≤0.5 and 0≤y≤0.5), $LiFeO_2$, $V_2O_5$, TiS, and MoS.

As a binder for the positive electrode, the positive composition that strongly binds positive active material particles to each other and to a current collector may be used. A suitable type and an amount of the binder for the positive electrode may be the same as those of the binder for a negative electrode.

When preparing a positive electrode active material composition, the conducting agent may comprise carbon black; graphite granules; natural graphite; artificial graphite; acetylene black; carbon fibers; carbon nanotubes; metal powder, metal fibers, or metal tubes of copper, nickel, aluminum, or silver; or a conductive polymer, such as, a polyphenylene derivative. The conducting agent is not limited thereto, and any suitable material available in the art may be used as a conducting agent.

A positive electrode active material composition may be obtained by mixing the positive electrode active material, the binder, the conducting agent, and a solvent.

Non-limiting examples of the solvent are water and N-methylpyrrolidone.

A process of preparing a positive electrode by using the positive electrode active material composition may be the same as a method of preparing the negative electrode, except that the positive electrode active material is used instead of the negative electrode active material.

Amounts of the positive electrode active material, the conducting agent, and the solvent may be the same as amounts thereof that are used in the manufacture of lithium secondary batteries in the art. At least one of the conducting agent and the solvent may be omitted according to the use and the structure of the lithium secondary battery. Any kind of various additives, for example, a dispersing agent, a thickening agent, or a filler, may be further used in the manufacture of the positive electrode if desired.

According to another aspect, a secondary battery including the negative electrode is provided. The secondary battery includes the negative electrode, a positive electrode, a separator, and a lithium salt-containing non-aqueous electrolyte.

The separator is disposed between the positive electrode and the negative electrode. The separator may be an insulating thin film having a high ion permeability and strong mechanical strength.

The separator may have a pore diameter of from about 0.01 μm to about 10 μm and a thickness of from about 5 μm to about 20 μm. Examples of the separator are olefin-based polymers, such as polypropylene, and sheets or non-woven fabric made of glass fiber or polyethylene. When a solid polymer electrolyte is used as the electrolyte, the solid polymer electrolyte may also serve as the separator.

In particular, an olefin-based polymer of the separator may be single-layered and include polyethylene, polypropylene, or polyvinylidene fluoride, or multiple-layered and include at least two layers formed of polyethylene, polypropylene, or polyvinylidene fluoride. The multiple-layered separator may have a mixed multiple-layered structure. For example, the separator may be a two-layered separator including polyethylene and polypropylene layers, a three-layered separator including polyethylene, polypropylene, and polyethylene layers, or a three-layered separator including polypropylene, polyethylene, and polypropylene layers.

The lithium salt-containing non-aqueous electrolyte is formed of a non-aqueous electrolyte and a lithium salt.

The non-aqueous electrolyte may be a non-aqueous electrolyte solution, an organic solid electrolyte, or an inorganic solid electrolyte.

The non-aqueous electrolyte may be, for example, an aprotic organic solvent, such as, N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydroxyfuran, 2-methyl tetrahydrofuran, dimethylsulfoxide, 1,3-dioxolane, formamide, dimethyl formamide, acetonitrile, nitromethane, methyl formate, methyl acetate, phosphate triester, trimethoxy methane, a dioxolane derivative, sulfolane, methyl sulfolane, 1,3-dimethyl-2-imidazolidinone, propylene a carbonate derivative, a tetrahydrofuran derivative, ether, methyl propionate, ethyl propionate, or fluoroethylenecarbonate ("FEC").

The organic solvent electrolyte may comprise, for example, a polyethylene derivative, a polyethylene oxide derivative, a polypropylene oxide derivative, an ester phosphate polymer, a poly agitation lysine, a polyester sulfide, a polyvinyl alcohol, poly vinylidene fluoride, or a polymer including an ionic dissociation group.

The inorganic solid electrolyte may be, for example, a nitride, a halide, or a sulfate of Li, such as, $Li_3N$, LiI, $Li_5NI_2$, $Li_3N$—LiI—LiOH, $Li_2SiS_3$, $Li_4SiO_4$, $Li_4SiO_4$—LiI—LiOH, or $Li_3PO_4$—$Li_2S$—$SiS_2$.

The lithium salt is easy to be dissolved in the non-aqueous electrolyte, and examples of the lithium salt include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, Lithium chloroborane, lower aliphatic lithium carbonate, or lithium tetrakisphenyl borate.

Also, in order to improve charging/discharging characteristics or flame-retardancy of the battery, pyridine, triethylphosphite, triethanolamine, cyclic ether, ethylene diamine, n-glyme, hexamethyl phosphoramide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, or aluminum trichloride, for example, may further be added to the non-aqueous electrolyte. In some embodiments, in order to provide flame-resistance, a halogen-containing solvent, such as, carbon tetrachloride or ethylene trifluoride may be further used.

Figure 2B:
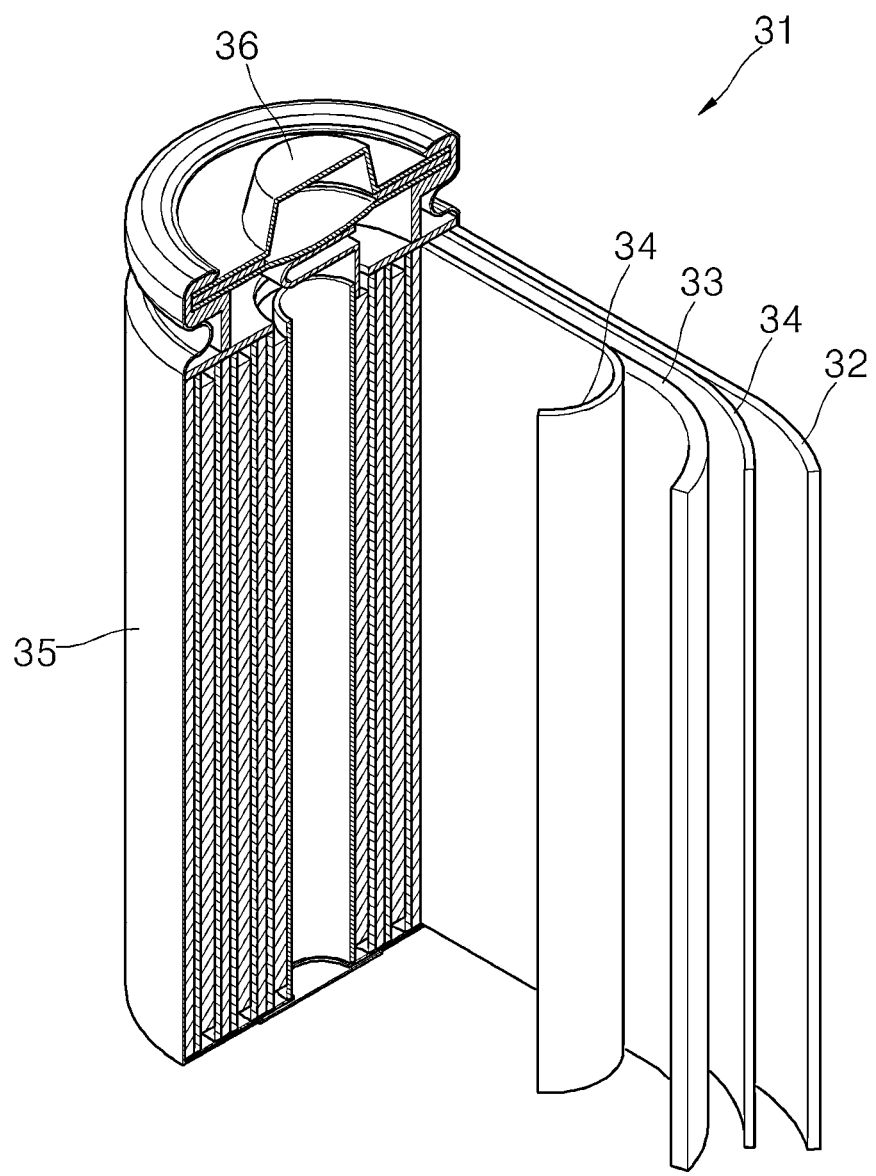
FIG. 2B is a schematic view of a structure of an embodiment of a lithium secondary battery.

As shown in FIG. 2B, a lithium secondary battery 31 includes a positive electrode 33, a negative electrode 32, and a separator 34. The positive electrode 33, the negative electrode 32, and the separator 34, prepared as described above, are wound or folded and disposed in a battery case 35. Then, the battery case 35 is filled with an organic electrolyte solution and sealed with a cap assembly 36, thereby completing the manufacture of the lithium secondary battery 31. The battery case 35 may be a cylindrical type, a rectangular type, or a thin-film type. For example, the lithium secondary battery 31 may be a thin-film type battery. The lithium secondary battery 31 may be a lithium ion battery.

The lithium secondary battery 31 may be a lithium ion battery having a charge voltage of about 4.3V or greater.

The separator 34 may be disposed between the positive electrode 33 and the negative electrode 32 to form a battery assembly. Alternatively, the battery assembly may be stacked in a bi-cell structure and impregnated with the electrolyte solution. The resultant is put into a pouch and hermetically sealed, thereby completing the manufacture of a lithium ion polymer battery.

Alternatively, a plurality of battery assemblies may be stacked to form a battery pack, which may be used in any device that requires high capacity and high output, for example, in a laptop computer, a smart phone, an electric vehicle, and the like.

In particular, the lithium secondary battery 31 may have improved high rate characteristics and lifetime characteristics, and thus may be applicable in an electric vehicle (EV), for example, in a hybrid vehicle such as plug-in hybrid electric vehicle (PHEV).

An embodiment will now be described in more detail with reference to the following examples. However, these examples are for illustrative purposes only and are not intended to limit the scope of the one or more embodiments.

EXAMPLES

Preparation Example 1: Preparation of Aqueous Lithium Polyacrylate Solution 5 grams (g) of polyacrylic acid and 3.03 g of LiOH were added and mixed in 127.5 g of deionized water, stirred at room temperature (20-25° C.) for 24 hours to obtain an aqueous solution containing 4 weight percent (wt %) lithium polyacrylate having a weight average molecular weight of $450 \times 10^3$ Daltons).

Example 1: Preparation of Negative Electrode

The 4 wt % lithium polyacrylate ("LiPAA") obtained in Preparation Example 1 was coated on a copper current collector and dried at a temperature of 100° C. to form an intermediate layer of the LiPAA at a thickness of about 1 micrometer (μm).

8 parts by weight of a silicon/graphite composite (NanosysGraphite including 8 wt % of silicon nanowires and 92 wt % of graphite, available from Nanosys Inc.) and 54.76 parts by weight of the 4 wt % aqueous lithium polyacrylate solution ("LiPAA") obtained in Preparation Example 1 were mixed to prepare a negative electrode active material slurry.

A coating of the negative electrode active material slurry was applied to the intermediate layer and dried at 100° C. to form a negative electrode active material layer, and thus a negative electrode was prepared. In the negative electrode active material layer, a weight ratio of the solid content of the silicon/graphite composite, as a negative electrode active material, and the lithium polyacrylate, as a binder, was controlled to be 88:12.

Example 2: Preparation of Negative Electrode

A negative electrode was prepared in the same manner used in Example 1, except that 8 parts by weight of a silicon nanoparticle active material having an average particle diameter of about 50 nm, and 8 parts of weight of graphite, having an average particle diameter of about 19 nm, were used instead of 8 parts by weight of the silicon/graphite composite in the preparation of the negative electrode active material slurry. In the negative electrode active material layer, a weight ratio of the solid content of the silicon nanoparticles and graphite, as negative electrode active materials, and the lithium polyacrylate, as a binder, was controlled to be 8:80:12.

Example 3: Preparation of Negative Electrode

A negative electrode was prepared in the same manner used in Example 2, except that 8 parts by weight of graphite (SFG6, available from Timcal) were used instead of 8 parts by weight of the graphite (having an average particle diameter of about 19 nm) in the preparation of the negative electrode active material slurry.

In the negative electrode active material layer, a weight ratio of the solid content of the silicon nanoparticles and graphite, as negative electrode active materials, and the lithium polyacrylate, as a binder, was controlled to be 8:80:12.

Comparative Example 1: Preparation of Negative Electrode 8 parts by weight of a silicon/graphite composite (NanosysGraphite including 8 wt % of silicon nanowires and 92 wt % of silicon) and 54.76 parts by weight of the 4 wt % lithium polyacrylate obtained in Preparation Example 1 were mixed to prepare a negative electrode active material slurry.

The negative electrode active material slurry was coated on a copper current collector and dried at about 100° C. to form a negative electrode active material layer, and thus a negative electrode was prepared. In the negative electrode active material layer, a weight ratio of the solid content of the silicon/graphite composite, as a negative electrode active material, and the lithium polyacrylate, as a binder, was controlled to be 88:12.

Comparative Example 2: Preparation of Negative Electrode

Silicon nanoparticles (an average particle diameter: about 50 nm), graphite (having an average particle diameter of about 19 nm), and the aqueous solution containing the 4 wt % lithium polyacrylate prepared in Preparation Example 1 were mixed to prepare a negative electrode active material slurry.

The negative electrode active material slurry was coated on a copper current collector and dried at about 100° C. to form a negative electrode active material layer, and thus a negative electrode was prepared. In the negative electrode active material layer, a weight ratio of the solid content of the silicon nanoparticles and graphite, as the negative electrode active materials, and the lithium polyacrylate, as a binder, was controlled to be 8:80:12.

Comparative Example 3: Preparation of Negative Electrode

Silicon nanoparticles (an average particle diameter: about 50 nm), graphite (SFG6), and the aqueous solution containing the 4 wt % lithium polyacrylate prepared in Preparation Example 1 were mixed to prepare a negative electrode active material slurry.

The negative electrode active material slurry was coated on a copper current collector and dried at about 100° C. to form a negative electrode active material layer, and thus a negative electrode was prepared. In the negative electrode active material layer, a weight ratio of the solid content of the silicon nanoparticles and graphite (SFG6), as negative electrode active materials, and the lithium polyacrylate, as a binder, was controlled to be 8:80:12.

Manufacturing Example 1: Manufacture of Coin Half Cell

The negative electrode prepared in Example 1, a lithium metal, as a counter electrode, a polypropylene separator, as a separator (Celgard 3510), and a solution including 1.3M $LiPF_6$ in a mixture of ethylene carbonate (EC) and diethyl carbonate (DEC) (at a volume ratio of 3:7), as an electrolyte, were used to manufacture a CR-2032 type coin half cell.

Manufacturing Examples 2-3: Manufacture of Coin Half Cells

Coin half cells were prepared in the same manner used in Preparation Example 1, except that each of the negative electrodes prepared in Examples 2 and 3 was used instead of the negative electrode prepared in Example 1.

Comparative Manufacturing Examples 1-3: Manufacture of Coin Half Cells

Coin half cells were prepared in the same manner used in Preparation Example 1, except that each of the negative electrodes prepared in Comparative Examples 1-3 was used instead of the negative electrode prepared in Example 1.

Evaluation Example 1: Scanning Electron Microscope-Energy Dispersive X-Ray ("SEM-EDX") Spectroscopy Analysis In the negative electrode prepared in Example 1, the copper current collector-intermediate layer-active material layer interface was etched by using a focused ion beam ("FIB") and an SEM-EDX analysis was performed thereon. The SEM analysis instrument was Helios 400S of Dual beam FIB available from FEI, and EDS was Apollo available from EDAX.

Figure 3:
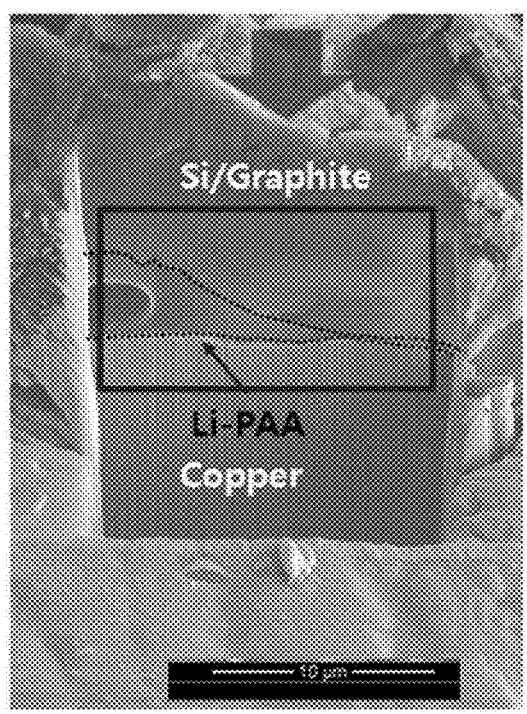
FIGS. 3 and 4 show the results of a scanning electron microscope-energy-dispersive X-ray ("SEM"-"EDX") spectroscopy analysis of a negative electrode prepared in Example 1.
Figure 4:
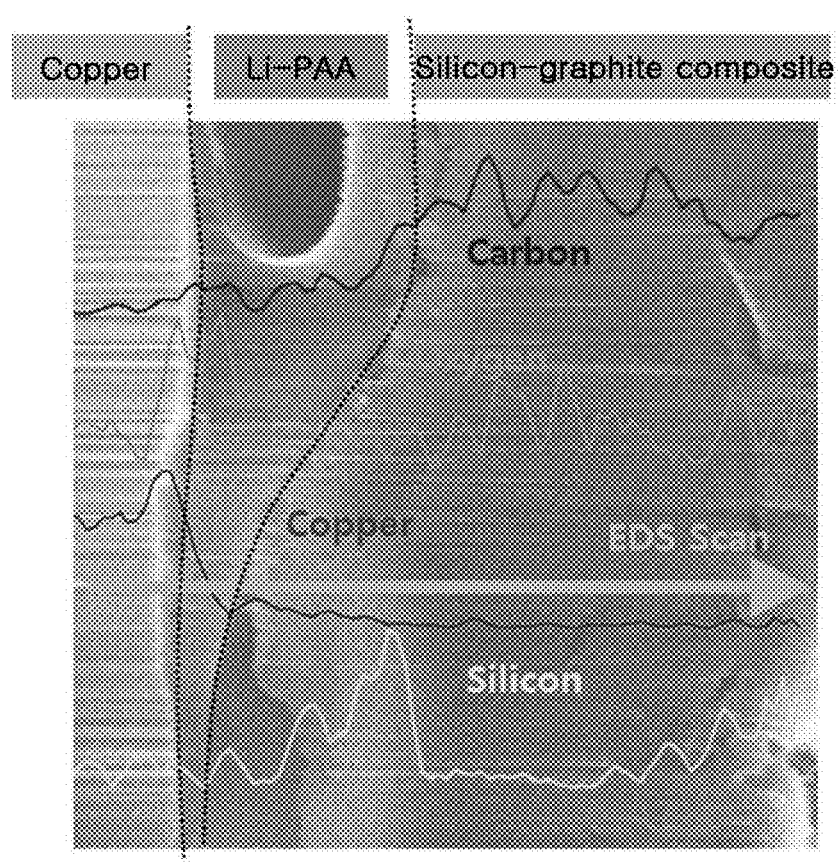

The analysis results are shown in FIGS. 3 and 4. FIG. 3 shows the SEM-EDX analysis result on the copper current collector-intermediate layer-active material layer interface after the FIB etching, and FIG. 4 shows an EDS line profile of carbon, oxygen, copper, and silicon obtained by performing the SEM-EDX analysis.

Referring to FIGS. 3 and 4, it was confirmed that an interlayer formed of LiPAA having a thickness of about 100 nm was present between the current collector and the negative electrode active material layer.

Evaluation Example 2: Peeling Test

A peeling test was performed on the negative electrode prepared in Example 1, and thus an adhesive strength between the copper current collector and an adhesive strength between the active material layer and the intermediate layer were evaluated.

The peeling test was performed by attaching adhesive tape to a top of a sample, peeling the adhesive tape from the top of the sample, and then observing a surface of the sample. The evaluation result is shown in FIG. 5.

Figure 5:
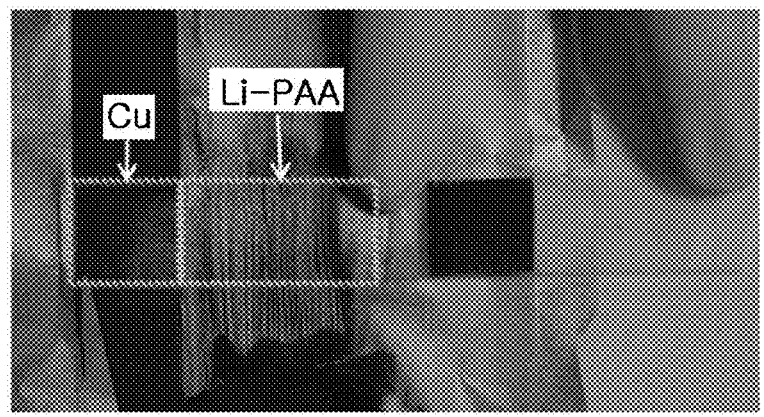
FIG. 5 shows the results of a stripping test of the negative electrode prepared in Example 1.

Referring to FIG. 5, it is confirmed that the adhesive strength between the intermediate layer and the active material layer in the negative electrode prepared in Example 1, is larger than the adhesive strength between the copper current collector and the active material layer. In this regard, it is confirmed that an interlayer containing LiPAA serves as an adhesion layer.

Evaluation Example 3: SEM-EDS Analysis

Figure 6A:
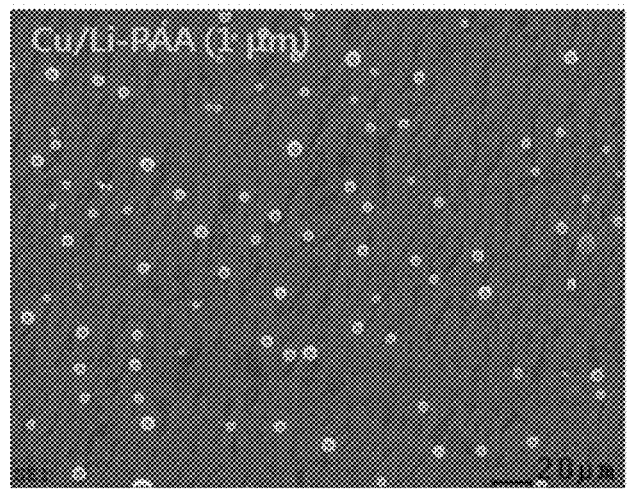
FIGS. 6A and 6B show the results of SEM imaging analysis and energy dispersive spectroscopy ("EDS") analysis of a structure prepared in Example 1 after forming a lithium polyacrylate interlayer on a copper current collector.
Figure 6B:
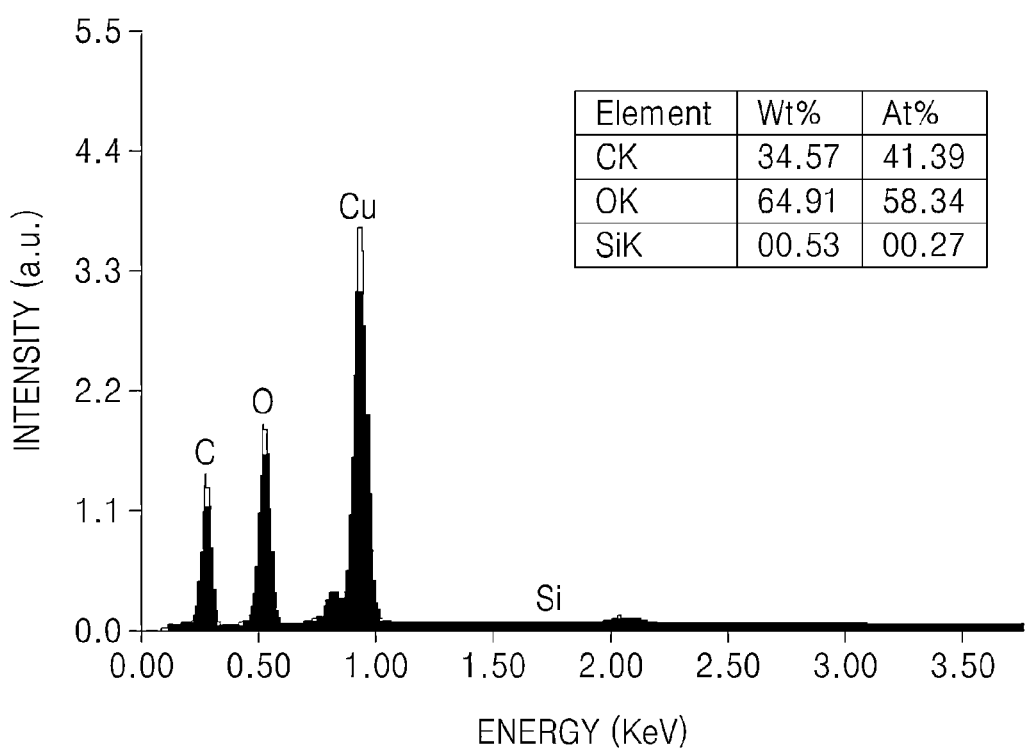
Figure 7A:
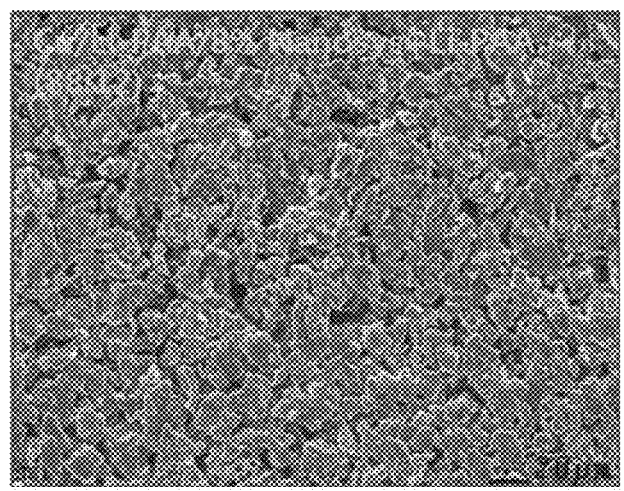
FIGS. 7A and 7B show the results of SEM imaging analysis and EDS analysis of the negative electrode prepared in Example 1 having a negative electrode active material layer on the interlayer.
Figure 7B:
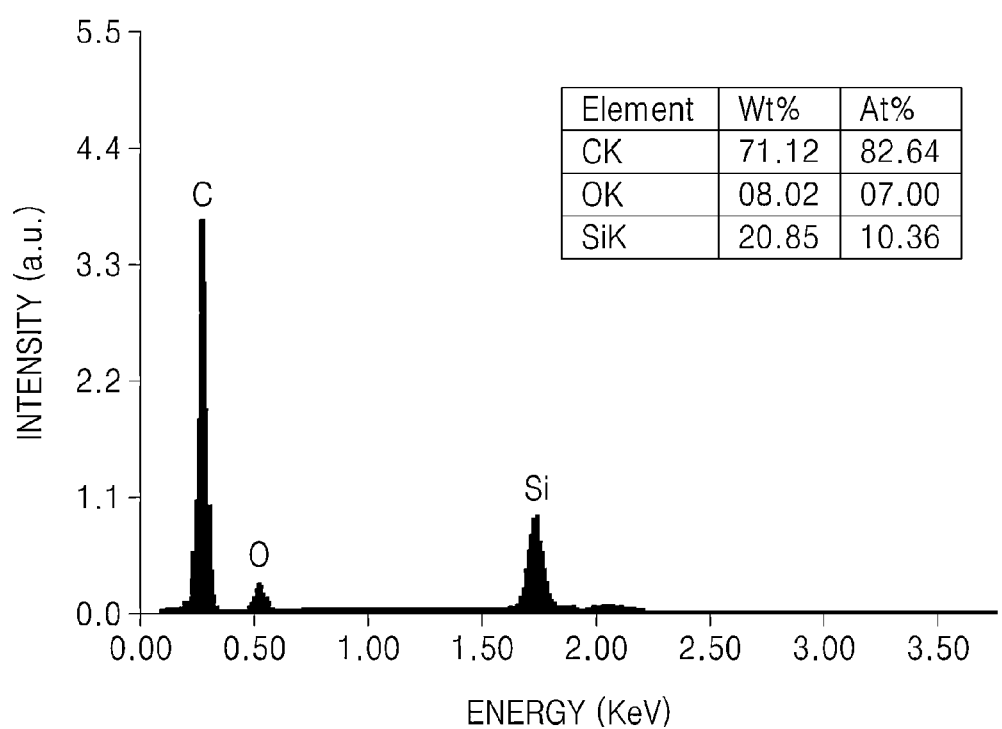

SEM image and EDS analysis was performed on a structure after forming an interlayer (including LiPAA) on a copper current collector in the same manner used in Example 1 and forming a negative electrode having a negative electrode active material layer formed on the interlayer, and the results are shown in FIGS. 6A, 6B, 7A, and 7B. FIGS. 6A and 6B show SEM analysis results and EDS analysis results of a surface of the interlayer after forming the interlayer (LiPAA) on the copper current collector, and FIGS. 7A and 7B show SEM analysis results and EDS analysis results of a surface of the negative electrode active material layer of the negative electrode prepared in Example 1.

In this regard, the interlayer formed of LiPAA has oxygen and carbon at an atomic ratio (or a weight ratio) of about 4:6. The negative electrode active material layer has a ratio of oxygen and carbon significantly different from that of the active material or the interlayer, and silicon was detected from the negative electrode active material layer.

Evaluation Example 4: Measurement of Volume Expansion Rate

In the initial charging process, the coin half cells prepared in Manufacturing Examples 1-3 and Comparative Manufacturing Examples 1-3 were charged with a constant current of 27.5 mA (0.05 C) per 1 g of the active material until 0.01 V (vs $Li/Li^+$), and then the coin half cells were each discharged with a constant current of 0.05 C until 1.0 V. In the second charging process, the coin half cells were charged with a constant current of 55 mA (0.1 C) per 1 g of the active material until 0.01 V (vs $Li/Li^+$), and then their electrodes were each discharged with a constant current of 0.1 C until 1.0 V. In the third charging process, the cells were charged with a constant current of 275 mA (0.5 C) per 1 g of the active material until 0.01 V (vs $Li/Li^+$), and then their electrodes were each discharged with a constant current of 0.5 C until 1.0 V. Subsequently, 100 cycles of the charging and discharging were performed on the cells using the same current and voltage period.

Then, the coin half cells were discharged again with the same constant currents, respectively, until the voltage was 1.0 V (vs. Li). 100 cycles of the charging and discharging process was performed on the cells.

After the $100^{th}$ cycle of the charging and discharging process, thicknesses of the coin half cells were measured to calculate volume expansion rates. The volume expansion rates were calculated by using Equation 1 below, and the results are shown in Table 1.

Volume expansion rate=(a thickness of a battery after $100^{th}$ cycle of charging and discharging/a thickness of the battery before performing the charging and discharging)×100    Equation 1

TABLE 1

| | Interlayer | Negative electrode active material layer composition | Volume expansion rate (%) |
|---|---|---|---|
| Example 1 | LiPAA | 8% NanosysGraphite + LiPAA (88:12 of a weight ratio) | 160 |
| Comparative Example 1 | x | 8% NanosysGraphite + LiPAA (88:12 of a weight ratio) | 190 |
| Example 2 | LiPAA | Si_NP(50 nm) + graphite + LiPAA (8:80:12 of a weight ratio) | 235 |
| Comparative Example 2 | x | Si_NP(50 nm) + graphite + LiPAA (8:80:12 of a weight ratio) | 270 |
| Example 3 | LiPAA | Si_NP (50 nm) + SFG6 + LiPAA (8:80:12 of a weight ratio) | 255 |
| Comparative Example 3 | x | Si_NP (50 nm) + SFG6 + LiPAA (8:80:12 of a weight ratio) | 300 |

As shown in Table 1, the coin half cells prepared in Examples 1-3 are respectively compared with the coin half cells prepared in Comparative Examples 1-3.

Referring to Table 1, the volume expansion rate of the coin half cell prepared in Example 1 was less than that of the coin half cell prepared in Comparative Example 1. It was confirmed that the volume expansion rates of the coin half cells prepared in Examples 2 and 3 were respectively less than those of the coin half cells prepared in Comparative Examples 2 and 3.

Evaluation Example 4: Charging/Discharging Characteristics (Initial Efficiency and Lifetime Characteristics)

1) Manufacturing Example 1 and Comparative Manufacturing Example 1

A charging/discharging process was performed on coin half cells prepared in Manufacturing Example 1 and Comparative Manufacturing Example 1. In the initial charging process, the cells were charged with a constant current of 27.5 mA (0.05 C) per 1 g of the active material until 0.01 V (vs Li/Li$^+$), and then their electrodes were each discharged with a constant current of 0.05 C until 1.0 V. In the second charging process, the cells were charged with a constant current of 55 mA (0.1 C) per 1 g of the active material until 0.01 V (vs Li/Li$^+$), and then their electrodes were each discharged with a constant current of 0.1 C until 1.0 V. In the third charging process, the cells were charged with a constant current of 275 mA (0.5 C) per 1 g of the active material until 0.01 V (vs Li/Li$^+$), and then their electrodes were each discharged with a constant current of 0.5 C until 1.0 V. Subsequently, 100 cycles of the charging and discharging were performed on the cells in the same current and voltage period. The results of the charging/discharging process are shown in Table 2. The charging/discharging process of Evaluation Example 4 was performed at 25° C.

The initial discharge capacity in Table 2 refers to a discharge capacity after the first cycle performed on each of the cells. Also, the initial efficiency refers to a ratio between a charge capacity and a discharge capacity after the first cycle, and the charging/discharging efficiency refers to a ratio between a charge capacity and a discharge capacity after the $100^{th}$ cycle.

A capacity retention rate refers to a ratio between a discharge capacity after the $100^{th}$ cycle and a discharge capacity after the first cycle.

TABLE 2

| | Initial discharge capacity (mAh/g) | Initial efficiency (%) | Capacity retention rate @$100^{th}$ Cyc.(@0.5 C) (%) |
|---|---|---|---|
| Manufacturing Example 1 | 570 | 88.6 | 88.7 |
| Comparative Manufacturing Example 1 | 573 | 87.2 | 86.7 |

Referring to Table 2, it was confirmed that an initial efficiency and a capacity retention rate of the coin half cell prepared in Manufacturing Example 1 was higher than those of the coin half cell prepared in Comparative Manufacturing Example 1.

2) Manufacturing Example 3 and Comparative Manufacturing Example 3

A charging/discharging process was performed on the coin half cells prepared in Manufacturing Example 3 and Comparative Manufacturing Example 3. In the initial charging process, the cells were charged with a constant current of 27.5 mA (0.05 C) per 1 g of the active material until 0.01 V (vs Li/Li$^+$), and then their electrodes were each discharged with a constant current of 0.05 C until 1.0 V. In the second charging process, the cells were charged with a constant current of 55 mA (0.1 C) per 1 g of the active material until 0.01 V (vs Li/Li$^+$), and then their electrodes were each discharged with a constant current of 0.1 C until 1.0 V. In the third charging process, the cells were charged with a constant current of 275 mA (0.5 C) per 1 g of the active material until 0.01 V (vs Li/Li$^+$), and then their electrodes were each discharged with a constant current of 0.5 C until 1.0 V. Subsequently, 100 cycles of the charging and discharging were performed on the cells in the same current and voltage period. The charging/discharging process of Evaluation Example 5 was performed at 25° C.

Figure 8:
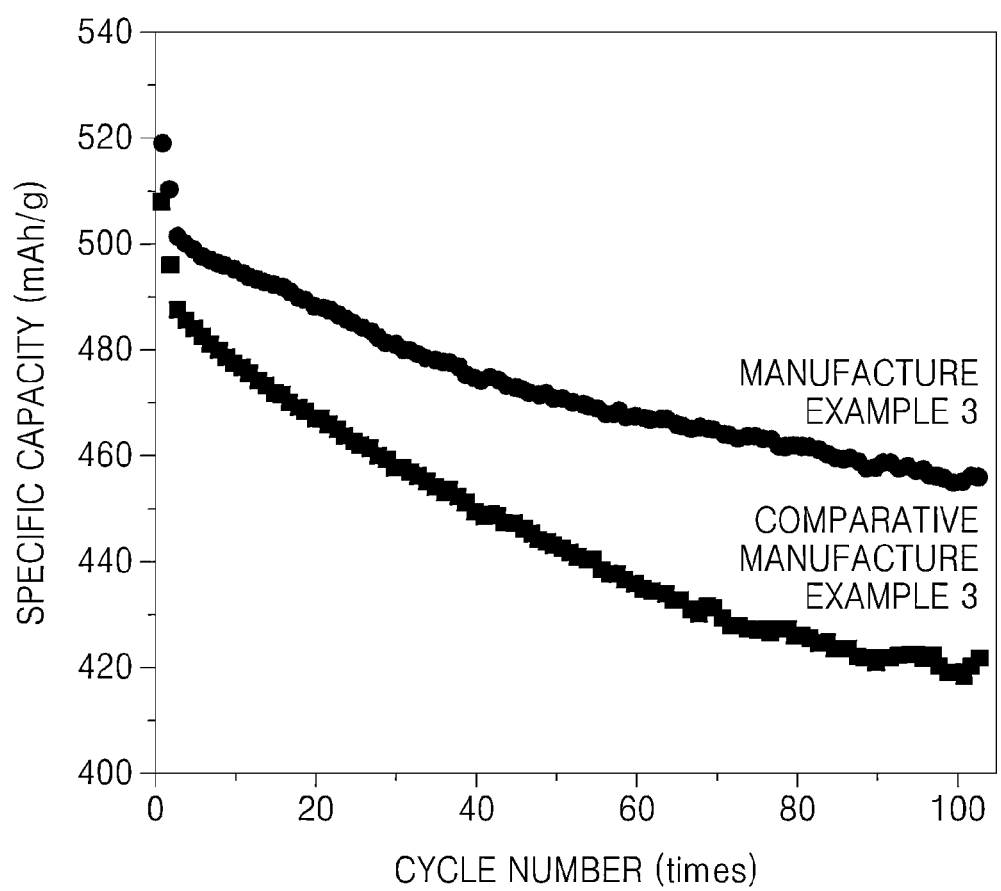
FIG. 8 shows specific capacity changes of coin-type half cells prepared in Manufacturing Example 3 and Comparative Manufacturing Example 3.

The specific capacity change according to the number of cycles in the charging/discharging process is shown in FIG. 8.

Referring to FIG. 8, it was confirmed that specific capacity characteristics of the coin half cell prepared in Manufacturing Example 3 improved compared to that of the coin half cell prepared in Comparative Manufacturing Example 3.

Evaluation Example 5: Evaluation of Relationship Between Specific Surface Area of Negative Electrode Active Material and Charging/Discharging Characteristics of Battery A charging/discharging process was performed on the coin half cells prepared in Manufacturing Examples 1-3 and Comparative Manufacturing Examples 1-3. In the initial charging process, the cells were charged with a constant current of 27.5 mA (0.05 C) per 1 g of the active material until 0.01 V (vs Li/Li$^+$), and then their electrodes were each discharged with a constant current of 0.05 C until 1.0 V. In the second charging process, the cells were charged with a constant current of 55 mA (0.1 C) per 1 g of the active material until 0.01 V (vs Li/Li$^+$), and then their electrodes were each discharged with a constant current of 0.1 C until 1.0 V. In the third charging process, the cells were charged with a constant current of 275 mA (0.5 C) per 1 g of the active material until 0.01 V (vs Li/Li$^+$), and then their electrodes were each discharged with a constant current of 0.5 C until 1.0 V. Subsequently, 100 cycles of the charging and discharging were performed on the cells in the same current and voltage period. The results of the charging/discharging process are shown in Table 3. The charging/discharging process of Evaluation Example 5 was performed at 25° C.

An initial discharge capacity in Table 1 refers to a discharge capacity of each of the cells after the first cycle. Also, an initial efficiency refers to a ratio between a charge capacity and a discharge capacity after the first cycle.

A capacity retention rate refers to a ratio between the discharge capacity after the 100$^{th}$ cycle and the discharge capacity after the first cycle.

TABLE 3

| | Specific surface area of a negative electrode active material (m$^2$/g) | Initial discharge capacity (mAh/g) | Initial efficiency (%) | Capacity retention rate @ 100$^{th}$ cycle (@ 0.5 C) (%) |
|---|---|---|---|---|
| Manufacturing Example 1 | 6.3 | 570 | 88.6 | 88.7 |
| Comparative Manufacturing Example 1 | 6.3 | 573 | 87.2 | 86.7 |
| Manufacturing Example 2 | 17.5 | 531 | 87.0 | 83.4 |
| Comparative Manufacturing Example 2 | 17.5 | 558 | 86.3 | 82.0 |
| Manufacturing Example 3 | 27.6 | 527 | 82.7 | 90.7 |
| Comparative Manufacturing Example 3 | 27.6 | 515 | 81.7 | 86.0 |

In Table 3, Manufacturing Examples 1-3 are respectively compared with Comparative Manufacturing Examples 1-3.

Figure 9:
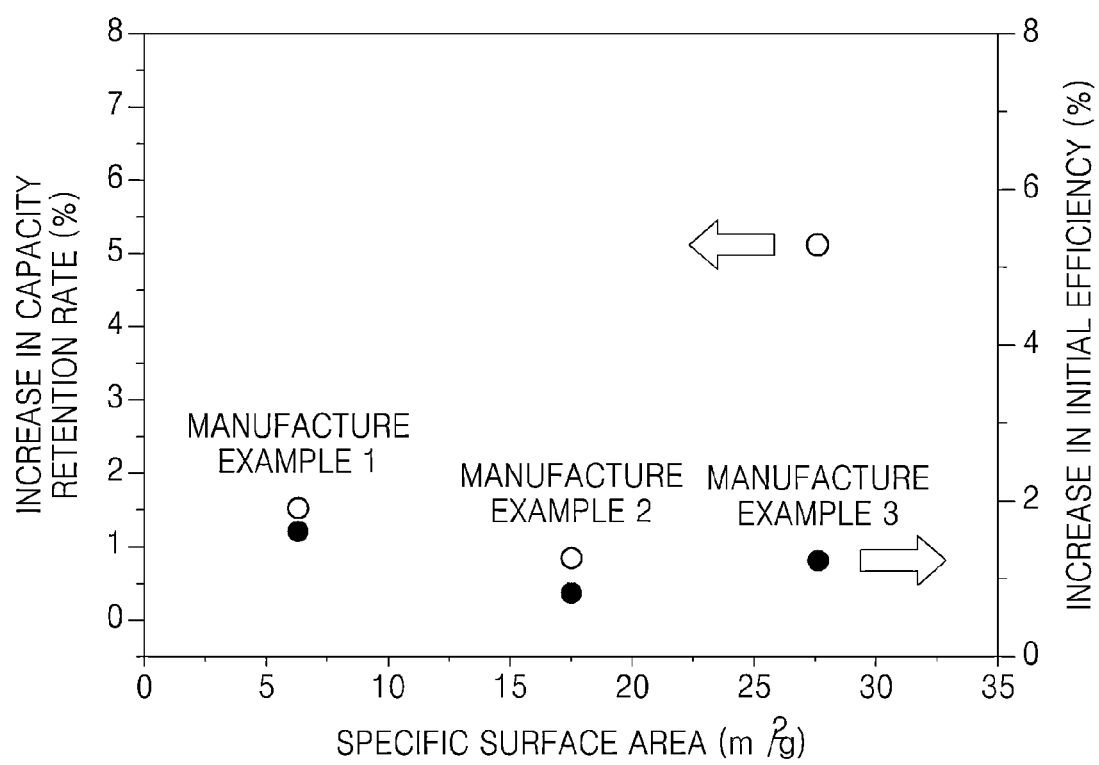
FIG. 9 shows an increase in initial efficiency and an increase in a capacity retention rate of each of the coin-type half cells prepared in Manufacturing Examples 1-3 compared to that of the coin-type half cells prepared in Comparative Manufacturing Examples 1-3.

Based on the results shown in Table 3, a relationship between an increase in the specific surface area of the negative electrode active material, an increase in the capacity retention rate, and an increase in the initial efficiency was calculated and shown in FIG. 9. Here, an increase in the initial efficiency and an increase in the capacity retention rate of the coin half cells prepared in Manufacturing Examples 1-3 were calculated by measuring the variation differences with respect to the initial efficiency and the capacity retention rate of the coin half cells prepared in Comparative Manufacturing Examples 1-3, respectively.

As shown in Table 3 and FIG. 9, an initial efficiency of a coin half cell had a similar tendency regardless of an increase in a specific surface area of a negative electrode active material. However, an increase in capacity retention rate was confirmed when a specific surface area of a negative electrode active material increases. In this regard, it may be confirmed that when a negative electrode active material with a large specific surface area is used, lifetime characteristics of a battery may be improved by including an interlayer formed of LiPAA therein.

As described above, according to the one or more of the above embodiments, a secondary battery with improved lifetime characteristics may be manufactured by improving adhesion between a current collector and a negative electrode active material of a negative electrode for a secondary battery.

It should be understood that the exemplary embodiments described therein should be considered in a descriptive sense only and not for purposes of limitation. Descriptions of features or aspects within each embodiment should typically be considered as available for other similar features or aspects in other embodiments.

While various embodiments have been described with reference to the figures, it will be understood by those of ordinary skill in the art that various changes in form and details may be made therein without departing from the spirit and scope as defined by the following claims.

What is claimed is:

1. A negative electrode for a secondary battery, the negative electrode comprising:
   a current collector;
   an interlayer directly on the current collector and consisting of a cation-substituted polycarboxylic acid; and
   a negative electrode active material layer directly on the interlayer, wherein the negative electrode active material layer comprises a negative electrode active material and a binder,
   wherein a polycarboxylic acid of the cation-substituted polycarboxylic acid is polyacrylic acid, polymethacrylic acid, polymaleic acid, poly(acrylate-co-maleic acid), poly(methylvinylether-alt-maleic acid), poly(butadiene-co-maleic acid), or a combination thereof,
   wherein a cation of the cation-substituted polycarboxylic acid is at least one selected from a lithium ion (Li$^+$), a sodium ion (Na$^+$), a potassium ion (K$^+$), and an ammonium ion (NH$_4^+$),
   and the negative electrode active material is at least one selected from silicon, a silicon oxide, a silicon alloy, a mixture of a silicon-comprising material and graphite, and a composite of the silicon-comprising material and the graphite, wherein the binder has a same composition as the interlayer.

2. The negative electrode of claim 1, wherein a weight average molecular weight of the cation-substituted polycarboxylic acid is from about 1,000 to about 1,000,000 Daltons.

3. The negative electrode of claim 1, wherein a glass transition temperature of the cation-substituted polycarboxylic acid is about 50° C. or greater.

4. The negative electrode of claim 1, wherein a melting point of the cation-substituted polycarboxylic acid is about 100° C. or higher.

5. The negative electrode of claim 1, wherein a thickness of the interlayer is from about 100 nanometers to about 10 micrometers.

6. The negative electrode of claim 1, wherein a thickness of the interlayer is from about 100 nanometers to about 2 micrometers.

7. The negative electrode of claim 1, wherein the cation-substituted polycarboxylic acid is a lithium polyacrylate, a lithium polymethacrylate, a poly(acrylate-co-maleic acid) lithium salt, a poly(methylvinylether-alt-maleic acid) lithium salt, a poly(butadiene-co-maleic acid) lithium salt, or a combination thereof.

8. The negative electrode of claim 1, wherein the binder consists of the cation-substituted polycarboxylic acid.

9. The negative electrode of claim 1, wherein the interlayer does not include a conducting agent.

10. The negative electrode of claim 1, wherein the binder consists of the cation-substituted polycarboxylic acid, and an amount of the cation-substituted polycarboxylic acid contained in the interlayer is greater than an amount of the cation-substituted polycarboxylic acid contained in the negative electrode active material layer.

11. The negative electrode of claim 1, wherein a cation of the cation-substituted polycarboxylic acid comprises at least 50 mole percent of the cation with respect to a molar equivalent of an acid group of the polycarboxylic acid.

12. The negative electrode of claim 1, wherein the cation-substituted polycarboxylic acid is lithium polyacrylate, and the negative electrode active material comprises at least one selected from silicon, a silicon oxide, a silicon alloy, a mixture of a silicon-comprising material and graphite, and a composite of the silicon-comprising material and the graphite.

13. The negative electrode of claim 1, wherein an amount of the binder is about 1 part to about 20 parts by weight, based on 100 parts by weight of the negative electrode active material layer.

14. A secondary battery comprising the negative electrode of claim 1.

15. The secondary battery of claim 14, wherein the secondary battery is a lithium secondary battery.

16. A flexible battery comprising the negative electrode of claim 1.

* * * * *